(12) United States Patent
Chang et al.

(10) Patent No.: US 12,380,527 B2
(45) Date of Patent: Aug. 5, 2025

(54) NON-CONTACT ELEVATOR CONTROL SYSTEM

(71) Applicant: Quanta Computer Inc., Taoyuan (TW)

(72) Inventors: Jung-Wen Chang, Taoyuan (TW); Chien-Hung Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 375 days.

(21) Appl. No.: 17/677,412

(22) Filed: Feb. 22, 2022

(65) Prior Publication Data

US 2023/0166943 A1  Jun. 1, 2023

(30) Foreign Application Priority Data

Nov. 30, 2021 (TW) ................. 110144503

(51) Int. Cl.
  *G06T 7/73* (2017.01)
  *G06T 1/00* (2006.01)

(52) U.S. Cl.
  CPC .............. *G06T 1/0007* (2013.01); *G06T 7/73* (2017.01); *G06T 2207/30268* (2013.01)

(58) Field of Classification Search
  None
  See application file for complete search history.

(56) References Cited

U.S. PATENT DOCUMENTS

| | | | |
|---|---|---|---|
| 2011/0069037 A1* | 3/2011 | Su .................. | G06F 3/04166 345/175 |
| 2015/0042836 A1* | 2/2015 | Lin .................. | H04N 25/58 348/222.1 |

(Continued)

FOREIGN PATENT DOCUMENTS

| | | | |
|---|---|---|---|
| AU | 2017200557 A1 * | 8/2017 | ............... B66B 1/46 |
| CN | 102214045 A * | 10/2011 | |
| CN | 110196494 A | 9/2019 | |
| TW | 201112092 A | 4/2011 | |

OTHER PUBLICATIONS

Chinese language office action dated May 4, 2022, issued in application No. TW 110144503.
Chinese language office action dated Jan. 18, 2025, issued in application No. CN 202111611296.7 (English language translation pp. 1-7 of attachment).

* cited by examiner

*Primary Examiner* — Vincent Rudolph
*Assistant Examiner* — Nicholas Crespo Stazer
(74) *Attorney, Agent, or Firm* — McClure, Qualey & Rodack, LLP

(57) ABSTRACT

A non-contact elevator control system having a control panel with multiple buttons, an image processor, a first and a second camera module, wherein the first and second camera modules are arranged at two adjacent corners of the control panel, is disclosed. When an object enters a detection range, the image processor obtains a first imaging position of the object based on a first image taken by the first camera module and a second imaging position of the object based on a second image taken by the second camera module. The image processor calculates the corresponding position of the object in the control panel according to the first and the second imaging positions, and the relative position information of the first and second imaging positions with respect to the first and second camera modules. The image processor triggers a corresponding button in the control panel based on the position.

8 Claims, 11 Drawing Sheets

(56) References Cited

U.S. PATENT DOCUMENTS

| | | | | |
|---|---|---|---|---|
| 2015/0317022 | A1* | 11/2015 | Liu | G06F 3/04166 345/175 |
| 2016/0188027 | A1* | 6/2016 | Liu | G06F 3/0428 345/175 |
| 2021/0371234 | A1* | 12/2021 | Nikovski | G06F 3/0484 |

| | 104 high luminance 731 OK | 104 low luminance 732 image invisible | 106 high luminance 733 image too bright | 106 low luminance 734 OK |

FIG. 7C

| | 104 high luminance 741 OK | 104 low luminance 742 image too dark or invisible | 106 high luminance 743 OK | 106 low luminance 744 image invisible |

FIG. 7D

| Position / Camera modules | 1001 | 1002 | 1003 | 1004 |
|---|---|---|---|---|
| 804+806 (First position) | ✓ | | ✓ | |
| 806+808 (Second position) | ✓ | | | |
| 808+810 (Third position) | ✓ | ✓ | | |
| 810+804 (Fourth position) | ✓ | | | ✓ |

1001 is the correct solution

NON-CONTACT ELEVATOR CONTROL SYSTEM

CROSS REFERENCE TO RELATED APPLICATIONS

This application claims priority of Taiwan Patent Application No. 110144503, filed on Nov. 30, 2021, the entirety of which is incorporated by reference herein.

BACKGROUND OF THE INVENTION

Field of the Invention

The present disclosure relates to an elevator control system, and, in particular, to a non-contact elevator control system.

Description of the Related Art

In the event of a disease pandemic such as COVID-19, direct and indirect contact among persons is to be avoided to reduce the risk of viral and bacterial infection. Among other surfaces, the control panels of elevators (especially the buttons on the panels) are a type of high-risk infection area with the potential to spread certain diseases due to the constant contact by a large number of persons. Thus, there is a need for a non-contact elevator control system with high reliability and robustness, so as to allow users to effectively control the operation of elevators without physically touching the control panels and the buttons on them.

BRIEF SUMMARY OF THE INVENTION

An aspect of the present disclosure relates to a non-contact elevator control system having a control panel with multiple buttons, an image processor, a first camera module, and a second camera module. The first and second camera modules are arranged at two adjacent corners of the control panel. When an object enters a detection range, the image processor obtains a first imaging position of the object based on a first image taken by the first camera module and a second imaging position of the object based on a second image taken by the second camera module, calculates a first position of the object in the control panel according to the first imaging position, the second imaging position and relative position information of the first imaging position and the second imaging position with respect to the first camera module and the second camera module, and sends a command signal to the control panel according to a button corresponding to the first position. The control panel triggers the button corresponding to the first position in response to the command signal.

BRIEF DESCRIPTION OF THE DRAWINGS

The present disclosure is accompanied by the annexed Figures as listed below. Same numerals in different Figures are intended to refer to same or similar components.

FIGS. 7A to 7E are schematic diagrams of various possible imaging patterns of the camera modules when an object is located at different positions on the control panel;

FIG. 8 is a schematic diagram of yet another exemplary embodiment of an elevator control system according to the present disclosure;

Figure 1A:
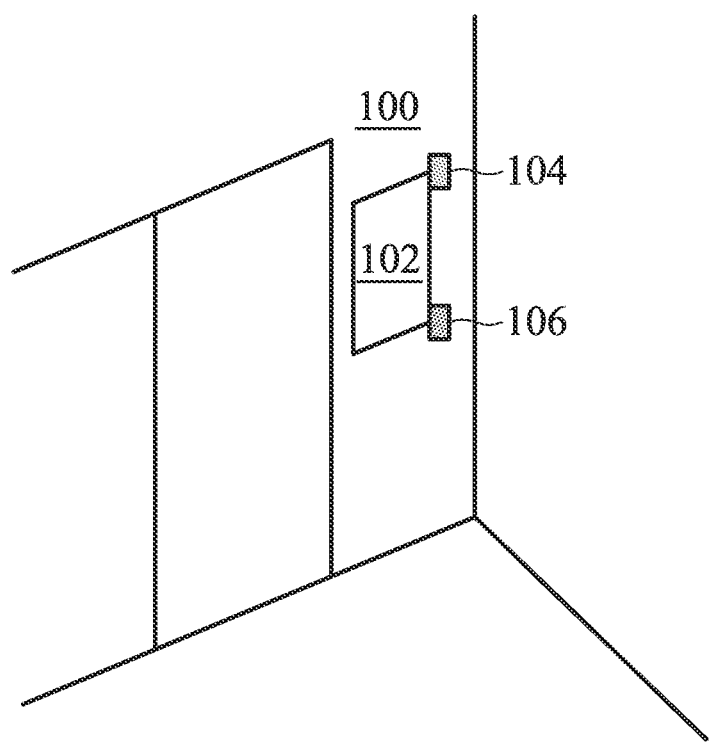
FIGS. 1A, 1B and 1C are schematic diagrams of an exemplary embodiment of an elevator control system according to the present disclosure.

The present disclosure is susceptible to various modifications and alternative forms. Some representative embodiments have been shown by way of example in the Drawings and will be described in detail herein. It should be understood, however, that the disclosure is not intended to be limited to the particular forms disclosed. Rather, the disclosure is to cover all modifications, equivalents, and alternatives falling within the spirit and scope of the disclosure as defined by the appended claims.

DETAILED DESCRIPTION OF THE INVENTION

The following disclosure describes various exemplary embodiments for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the Figures. The spatially relative terms are intended to encompass different orientations of the device in use or operation in addition to the orientation depicted in the Figures. The apparatus may be otherwise oriented (rotated 90 degrees or at other orientations) and the spatially relative descriptors used herein may likewise be interpreted accordingly.

Figure 1C:
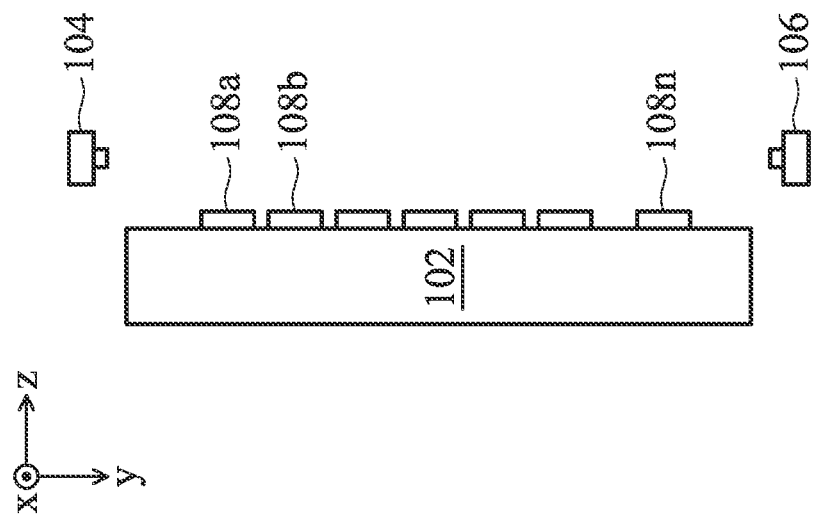
Figure 1B:
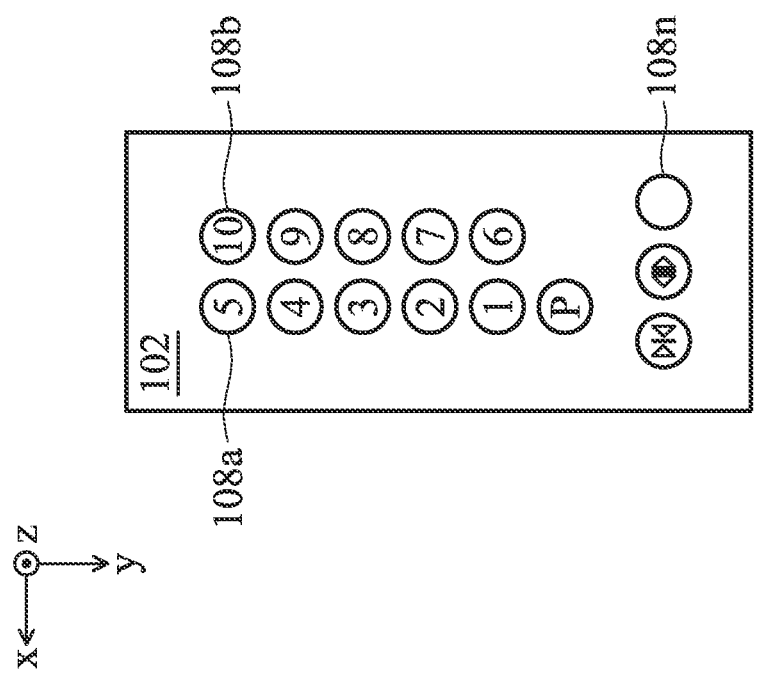

FIGS. 1A, 1B and 1C are schematic diagrams of an exemplary embodiment of an elevator control system 100 according to the present disclosure. Referring to FIG. 1A, the elevator control system 100 includes a control panel 102, an image processor (not shown), and two camera modules 104 and 106. Camera modules 104 and 106 are arranged at two adjacent respective corners of the control panel 102. The field of view (FOV) of each of the camera modules 104 and 106 encompasses the entirety of the control panel 102. Normally, the control panel 102 is arranged on a wall of the elevator and perpendicular to the ground, but the present disclosure is not limited thereto.

Referring to FIG. 1B, the control panel 102 includes buttons, e.g. 108a, 108b and 108n, to control the operation of the elevator.

As described above, the FOV of each of the camera modules 104 and 106 encompasses the entirety of the control panel 102. To achieve this, the positions of the camera modules 104 and 106 must be slightly above (e.g. 5 cm) the control panel 102 in the z-direction (the direction perpendicular to the xy-plane that the control panel 102 is located at) to prevent from hindering the FOVs of the camera modules 104 and 106, as shown in FIG. 1C.

Figure 2:
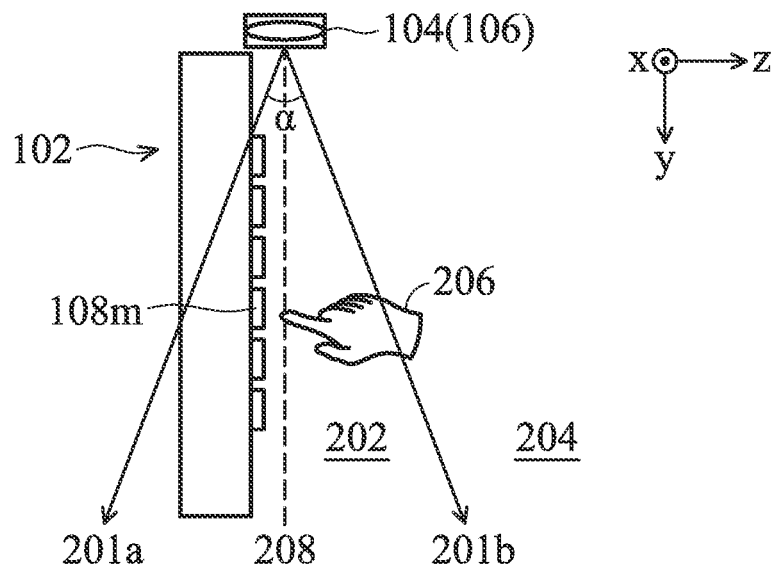
FIG. 2 is a schematic diagram of an exemplary embodiment of a non-contact detection mechanism of an elevator control system according to the present disclosure.

FIG. 2 is a schematic diagram of an exemplary non-contact detection mechanism of the elevator control system 100 according to the present disclosure. As shown in FIG. 2, the FOV of the camera module 104 (or 106) on the yz-plane is divided into a detection zone 202 and a non-detection zone 204 by half-lines 201a and 201b. The area between the half-lines 201a and 201b is the detection zone 202 while the area other than the detection zone 202 is the non-detection zone 204. The angle α between the half-lines 201a and 201b is smaller than the angle of view of the camera module 104 (or 106) on the yz-plane. A virtual plane 208 is located in front of the control panel 102 and is parallel to the control panel 102 with a distance (e.g. 5 cm) apart in the z-direction. The virtual zone 208 is located within the detection zone 202. When an object 206 (e.g. a finger of a user) approaches (but need not to touch) a button 108m on the control panel 102, the button 108m may be triggered as discussed below.

Figure 3:
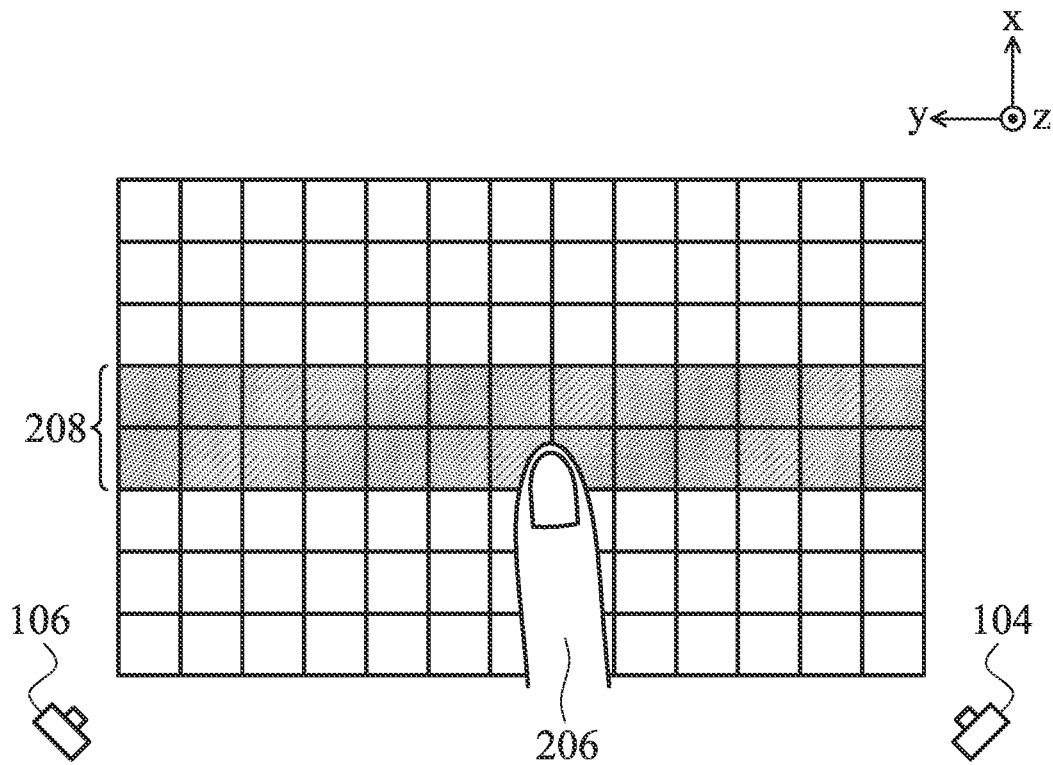
FIG. 3 is a schematic diagram of an exemplary embodiment of a virtual plane according to the present disclosure.

FIG. 3 is a schematic diagram of an example of the virtual plane 208 according to the present disclosure. In FIG. 3, the FOV of the camera module 104 (or 106) encompasses the entirety of the control panel 102 (not shown in FIG. 3), and the image within the FOV corresponds to a plurality of pixels (represented by blocks in FIG. 3). However, in the FOV, only the area that includes the buttons 108a to 108n on the control panel is the region of interest (ROI). Thus, to eliminate unnecessary computations caused by the objects not within the ROI, a subset of the pixels is defined as the virtual plane 208 (shown in FIG. 3 as gray blocks), wherein the virtual plane 208 encompasses the area including the buttons 108a to 108n on the control panel 102.

In the following examples, the object 206 is, but not limited to, a finger of a user. When the object 206 enters the detection zone 202, if the object 206 is located within the virtual plane 208, then the camera module 104 (or 106) records the image of the object 206; in other words, the detection range of the elevator control system 100 is the intersection area of the detection zone 202 and the virtual plane 208. If the time duration of the object 206 staying within the virtual plane 208 reaches a predetermined threshold value (such as, but not limited to, 0.5 seconds to 1 second), then the camera module 104 (or 106) sends the image of the object 206 to the image processor to calculate the imaging position of the object 206 on the image. The time duration of the object 206 staying within the virtual plane 208 may be measured by well-known techniques, such as, but not limited to, dividing the threshold time with the number of frames per second (FPS) of the camera module 104 (or 106) to obtain a target number of image frames. When the number of image frames that include the object 206 reaches the target number of image frames, it may be determined that the time duration of the object 206 staying within the virtual plane 208 reaches the threshold time.

Figure 4:
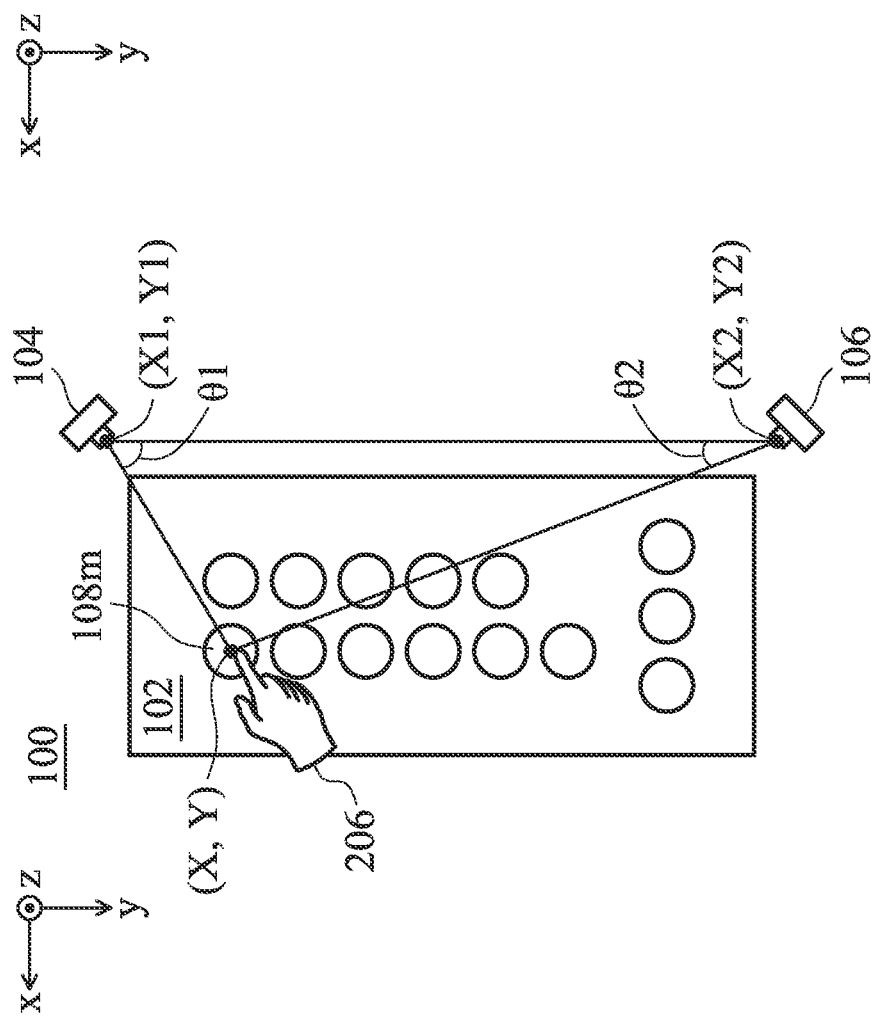
FIG. 4 is a schematic diagram of an exemplary embodiment of a position calculation mechanism of an elevator control system according to the present disclosure.

FIG. 4 is a schematic diagram of an exemplary position calculation mechanism of the elevator control system 100 according to the present disclosure. In the xy-plane, the coordinate of the camera module 104 is (X1, Y1), which is known; the coordinate of the camera module 106 is (X2, Y2), which is known; and the coordinate of the object 206 is (X, Y), which is to be solved. When the object 206 enters detection range and stays for a period of time, the camera modules 104 and 106 record a first image and a second image of the object 206 respectively, and send the first image and the second image to the image processor. Subsequently, the image processor calculates the angle θ1 shown in FIG. 4 by the imaging position of the object 206 on the first image, and calculates the angle θ2 shown in FIG. 4 by the imaging position of the object 206 on the second image. According to well-known triangulation methods, the coordinate (X, Y) of the object 206 may be solved with the coordinates (X1, Y1) and (X2, Y2) and the angles θ1 and θ2. After solving the coordinate (X, Y) of the object 206, the image processor maps the coordinate (X, Y) to a button 108m on the control panel 102, and sends a command signal representing the button 108m to the control panel 102, so as to make the control panel 102 trigger the button 108m in response to the command signal.

Figure 5:
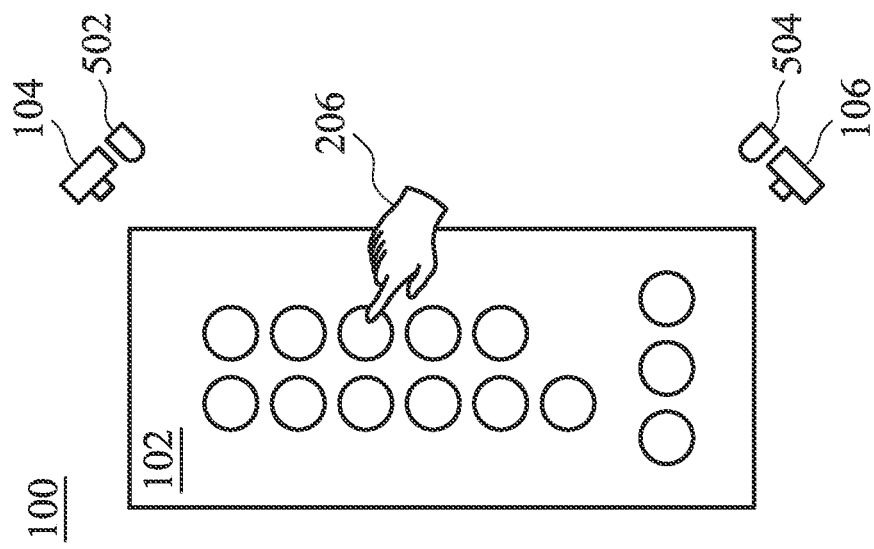
FIG. 5 is a schematic diagram of another exemplary embodiment of an elevator control system according to the present disclosure.

FIG. 5 is a schematic diagram of another exemplary embodiment of the elevator control system 100 according to the present disclosure. As shown in FIG. 5, each of the camera modules 104 and 106 includes a light-emitting diode (LED) 502 and 504 respectively, emitting, for example, infrared light as the light source of the camera modules 104 and 106. When the camera module 104 (or 106) is recording the image of the object 206, the object 206 is illuminated by the light emitted from the LED 502 (or 504) and reflects light to the image sensor of the camera module 104 (or 106), so as to display the image of the object 206 on the image sensor. However, when the object 206 approaches the camera module 104 (or 106), the luminance of the object 206 increases, which may lead to an over-exposure of the image in the image sensor of the camera module 104 (or 106), resulting in the imaging position of the object 206 on the image unclear, making the calculation of obtaining the coordinate of the object 206 through triangulation methods impossible. To overcome this issue, the light-emitting patterns of the LEDs 502 and 504 must be adjusted as discussed below.

FIGS. 6A to 6D show an exemplary image recording mechanism of the exemplary elevator control system 100 illustrated in FIG. 5. When the camera module 104 (or 106) is recording the image of the object 206, the LEDs 502 and 504 emit light in a first luminance and a second luminance respectively, wherein the first luminance is a high luminance (e.g. 100% of the luminance of LEDs 502 and 504) and the second luminance is a low luminance (e.g. 20% of the luminance of LEDs 502 and 504), so that the camera modules 104 and 106 may record a high luminance image and a low luminance image under the first luminance and the second luminance respectively. Subsequently, the image processor selects an image, in which the imaging of the object 206 is clear, from the high luminance image and the low luminance image, for subsequent triangulation calculations.

Figure 6A:
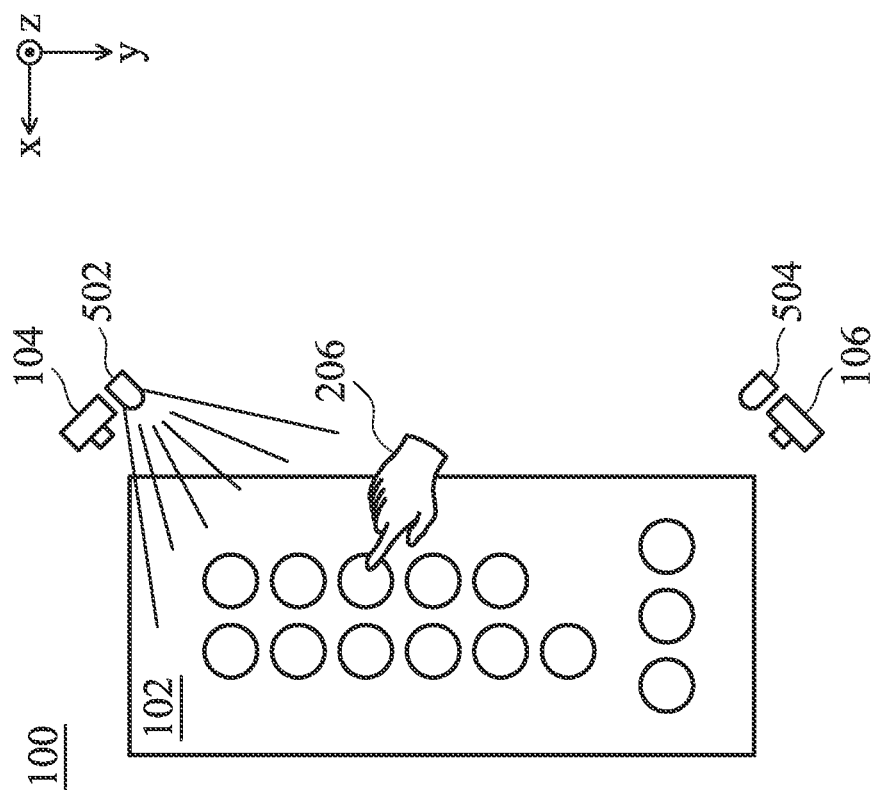
FIGS. 6A to 6D are schematic diagrams of an exemplary pattern of the camera modules recording an object according to the present disclosure.
Figure 6B:
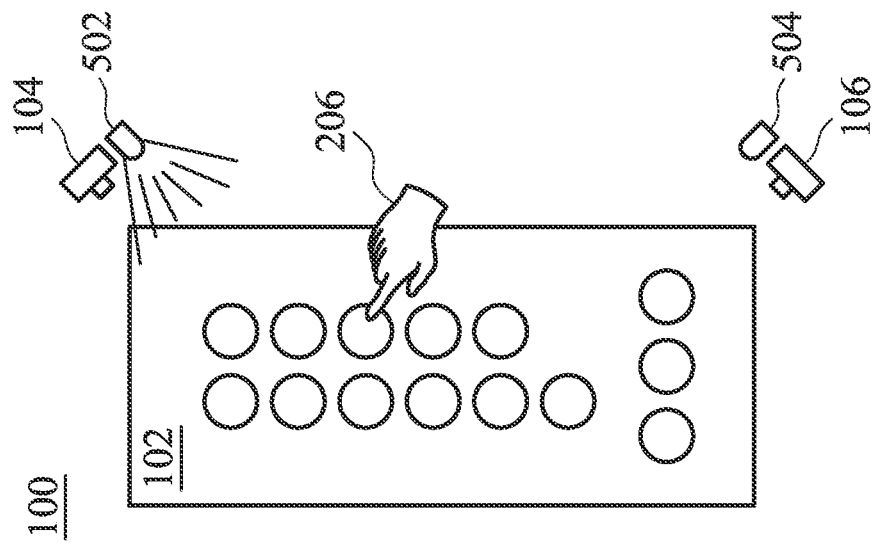

FIGS. 6A and 6B show two patterns of the camera module 104 recording the object 206. In FIG. 6A, the LED 502 emits light in the first luminance (high luminance) to allow the camera module 104 to record the high luminance image of the object and send the high luminance image to the image processor. In FIG. 6B, the LED 502 emits light in the second luminance (low luminance) to allow the camera module 104 to record the low luminance image of the object and send the low luminance image to the image processor. Subsequently, the image processor selects an image, in which the imaging of the object 206 is clear, from the high luminance image and the low luminance image, as a first image, for subsequent triangulation calculations.

Figure 6C:
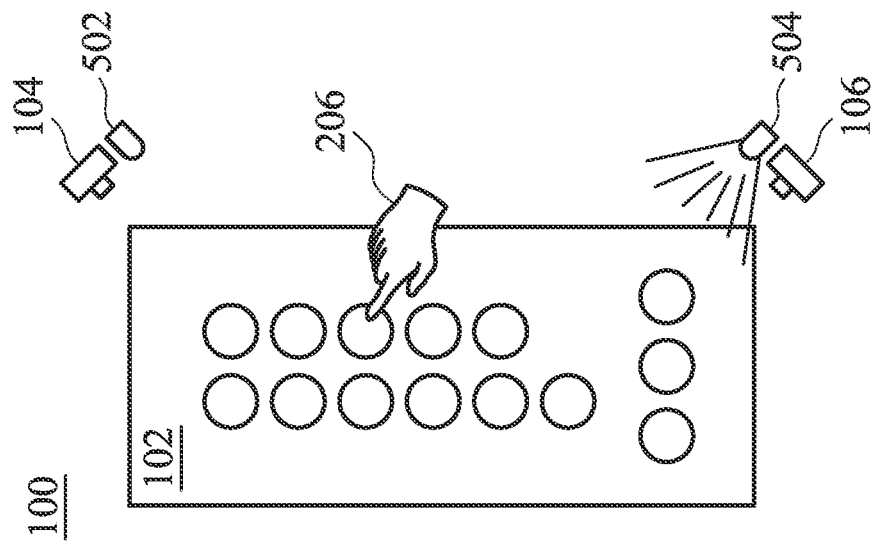
Figure 6D:
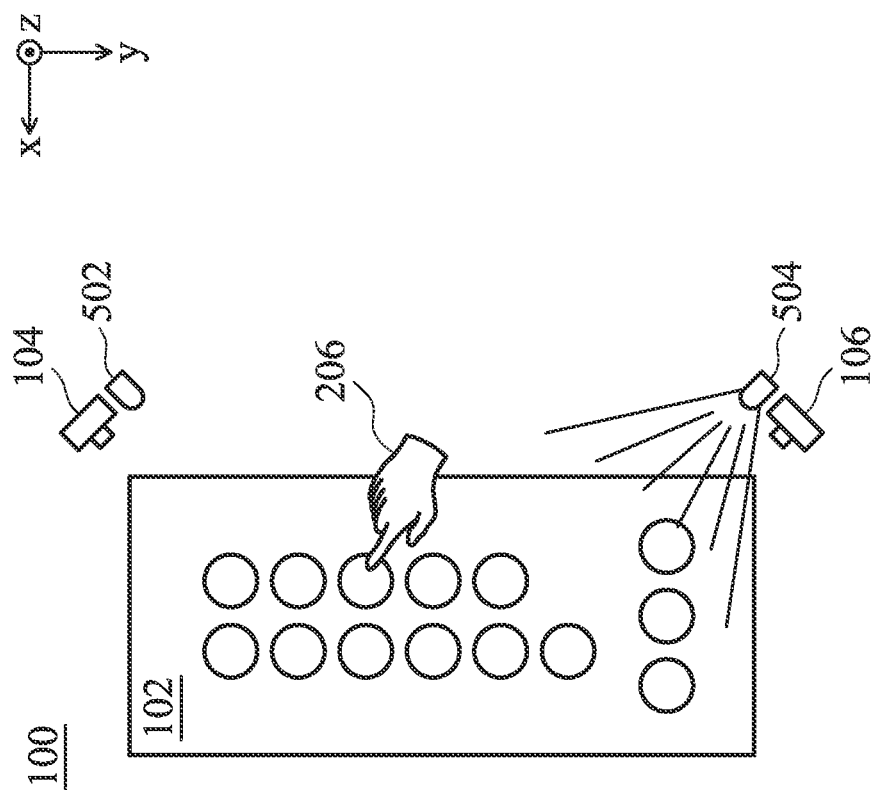

Similarly, FIGS. 6C and 6D show two patterns of the camera module 106 recording the object 206. In FIG. 6C, the LED 504 emits light in the first luminance (high luminance) to allow the camera module 106 to record the high luminance image of the object and send the high luminance image to the image processor. In FIG. 6D, the LED 504 emits light in the second luminance (low luminance) to allow the camera module 106 to record the low luminance image of the object and send the low luminance image to the image processor. Subsequently, the image processor selects an image, in which the imaging of the object 206 is clear, from the high luminance image and the low luminance image, as a second image, for subsequent triangulation calculations.

Figure 7A:
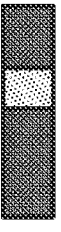

FIGS. 7A to 7E show various possible imaging patterns of the camera modules 104 and 106 when the object 206 is located at different positions on the control panel 102. In FIG. 7A, the distances between the object 206 and each of the camera modules 104 and 106 are both moderate. The images recorded by the camera module 104 include a high luminance image 711 and a low luminance image 712, and the images recorded by the camera module 106 include a high luminance image 713 and a low luminance image 714. The imaging of the high luminance images 711 and 713 is clear, and the imaging of the low luminance images 712 and 714 is relatively dark. Thus, the high luminance image 711 of the camera module 104 is selected as the first image, and the high luminance image 713 of the camera module 106 is selected as the second image.

Figure 7B:

In FIG. 7B, the object 206 is relatively close to the camera module 104 and relatively distant from the camera module 106. The images recorded by the camera module 104 include a high luminance image 721 and a low luminance image 722, and the images recorded by the camera module 106 include a high luminance image 723 and a low luminance image 724. As shown in FIG. 7B, the closeness of the object 206 and the camera module 104 leads to a higher image luminance of the object 206 on the camera module 104, resulting in the over-exposure of the high luminance image 721 and the image of the object 206 unclear. On the contrary, the imaging of the low luminance image 722 is relatively clear. On the other hand, the remoteness of the object 206 and the camera module 106 leads to a lower image luminance of the object 206 on the camera module 106, resulting in a relatively clear high luminance image 723 and an under-illuminated low luminance image 724. Thus, the low luminance image 722 of the camera module 104 is selected as the first image, and the high luminance image 723 of the camera module 106 is selected as the second image.

Similarly, in FIG. 7C, the object 206 is relatively distant to the camera module 104 and relatively close from the camera module 106. The images recorded by the camera module 104 include a high luminance image 731 and a low luminance image 732, and the images recorded by the camera module 106 include a high luminance image 733 and a low luminance image 734. As shown in FIG. 7C, the remoteness of the object 206 and the camera module 104 leads to a lower image luminance of the object 206 on the camera module 104, resulting in a relatively clear high luminance image 731 and an under-illuminated low luminance image 732. On the other hand, the closeness of the object 206 and the camera module 106 leads to a higher image luminance of the object 206 on the camera module 106, resulting in the over-exposure of the high luminance image 733 and the image of the object 206 unclear. On the contrary, the imaging of the low luminance image 734 is relatively clear. Thus, the high luminance image 731 of the camera module 104 is selected as the first image, and the low luminance image 734 of the camera module 106 is selected as the second image.

In FIG. 7D, the object 206 has a moderate distance with the camera module 104 and is relatively distant from the camera module 106. The images recorded by the camera module 104 include a high luminance image 741 and a low luminance image 742, and the images recorded by the camera module 106 include a high luminance image 743 and a low luminance image 744. The high luminance images 741 and 743 are relatively clear, and the low luminance images 742 and 744 are under-illuminated. Thus, the high luminance image 741 of the camera module 104 is selected as the first image, and the high luminance image 743 of the camera module 106 is selected as the second image.

Figures 7E, 8:
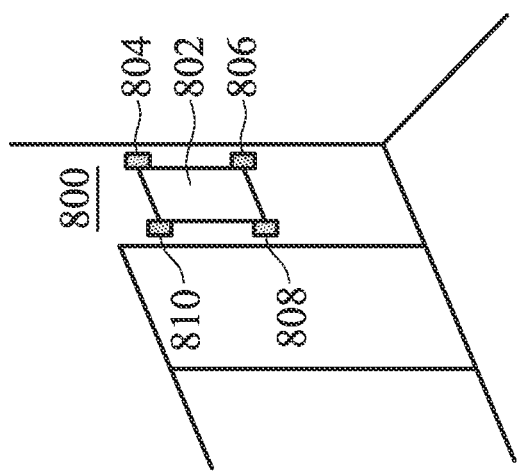

Similarly, in FIG. 7E, the object 206 is relatively distant from the camera module 104 and has a moderate distance with the camera module 106. The images recorded by the camera module 104 include a high luminance image 751 and a low luminance image 752, and the images recorded by the camera module 106 include a high luminance image 753 and a low luminance image 754. The high luminance images 751 and 753 are relatively clear, and the low luminance images 752 and 754 are under-illuminated. Thus, the high luminance image 751 of the camera module 104 is selected as the first image, and the high luminance image 753 of the camera module 106 is selected as the second image.

FIG. 8 shows another exemplary elevator control system 800. The elevator control system 800 has three or more camera modules (the following discussion is based on the example of four camera modules, but the present disclosure is not limited thereto), providing higher reliability and tolerance compared to the aforementioned elevator control system 100. In FIG. 8, camera modules 804, 806, 808 and 810 are arranged at four corners of the control panel 802. The camera module 804 is adjacent to the camera modules 806 and 810, the camera module 806 is adjacent to the camera modules 804 and 808, the camera module 808 is adjacent to the camera modules 806 and 810, and the camera module 810 is adjacent to the camera modules 804 and 808. The structures and functions of the camera modules 804, 806, 808 and 810 are similar to the aforementioned camera modules 104 or 106 and are thus omitted herein.

One of the advantages of using three or more camera modules is that it allows the calculation of obtaining a set of possible positions with each two adjacent camera modules and taking the intersection of the possible positions as the solution, so as to remove false solutions due to potential external disturbances (e.g. reflective objects), and to keep the system operate normally when one of the camera modules is damaged. In the example shown in FIG. 8, each two adjacent camera modules of the four camera modules 804, 806, 808 and 810 are paired to solve a set of possible positions; thus, there are four sets of possible positions (solved with camera module pairs 804-806, 806-808, 808-810 and 810-804, respectively). The intersection of the four sets of possible positions is the position of the object.

Figure 9:
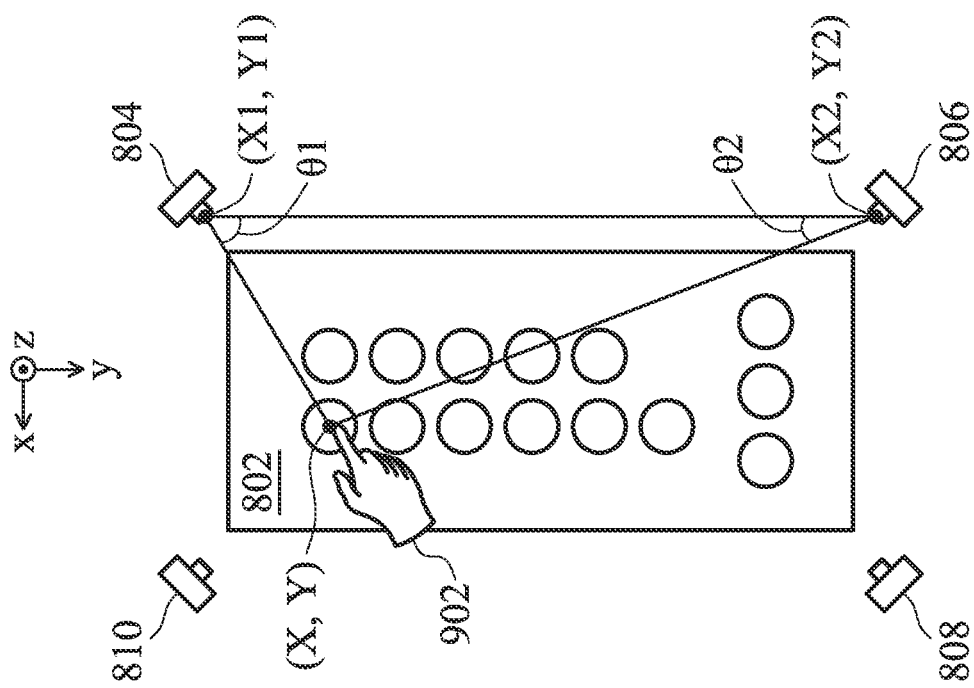
FIG. 9 is a schematic diagram of another exemplary embodiment of a position calculation mechanism of an elevator control system according to the present disclosure.

FIG. 9 shows an example of the operation process discussed above. In the xy-plane, the coordinate of the camera module 804 is (X1, Y1), which is known; the coordinate of the camera module 806 is (X2, Y2), which is known; and the coordinate of the object 902 (e.g. a finger of a user) is (X, Y), which is to be solved. When the object 902 enters detection range and stays for a period of time, the camera modules 804 and 806 record a first image and a second image of the object 902 respectively, and sends the first image and the second image to the image processor. Subsequently, the image processor calculates the angle θ1 shown in FIG. 9 by the imaging position of the object 902 on the first image, and calculates the angle θ2 shown in FIG. 9 by the imaging position of the object 902 on the second image. According to well-known triangulation methods, the coordinate of a first position of the object 902 may be solved with the coordinates (X1, Y1) and (X2, Y2) and the angles θ1 and θ2. Then, the camera module pairs 806-808, 808-810 and 810-804 repeat the recording process described above, and the image processor solves the coordinates of second, third and fourth positions of the object 902. If at least one of the coordinates of the first, second, third and fourth positions is not unique due to reasons such as external disturbances or damages in the camera modules, the image processor takes the intersection of the coordinates of the first, second, third and fourth positions as the position of the object 902, and maps the position of the object 902 to a button on the control panel 802. Subsequently, the image processor sends a command signal representing the button to the control panel 802, so as to make the control panel 802 trigger the button in response to the command signal.

Figure 10A:
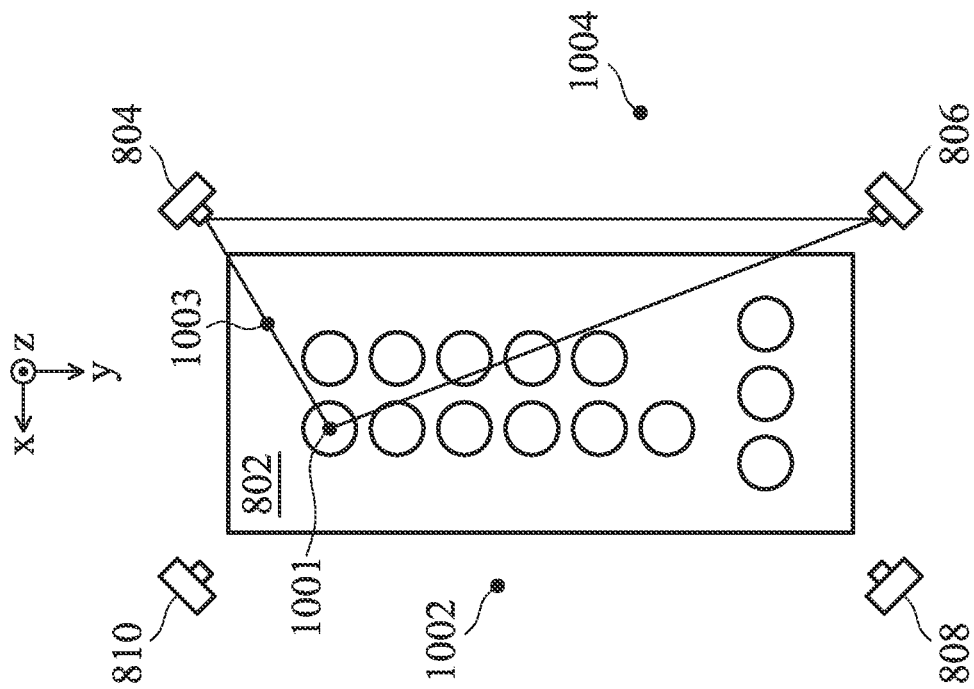
FIG. 10A is a schematic diagram of a positioning pattern calculated by the position calculation mechanism illustrated in FIG. 9.
Figure 10B:
FIG. 10B shows a table of the position information calculated with different pairs of camera modules.

If at least one of the coordinates of the first, second, third and fourth positions is not unique, the image processor takes the intersection of the coordinates of the first, second, third and fourth positions as the coordinate (X, Y) of the object 902. In FIG. 10A, the image processor has obtained four possible positions 1001, 1002, 1003 and 1004 from the images recorded by the camera module pairs 804-806, 806-808, 808-810 and 810-804 respectively. As shown in FIG. 10B, the first positions obtained with the camera module pair 804-806 are the positions 1001 and 1003, the second position obtained with the camera module pair 806-808 is the position 1001, the third positions obtained with the camera module pair 808-810 are the positions 1001 and 1002, and the fourth positions obtained with the camera module pair 810-804 are the positions 1001 and 1004. The image processor then takes the intersection of the first, second, third and fourth positions (i.e. the position 1001) as the position of the object 902, and maps the position of the object 902 to a corresponding button on the control panel 802, so as to command the control panel 802 to trigger the button. In this case, the buttons (if any) corresponding to the positions 1002, 1003 and 1004 are not triggered.

The foregoing discussion is based on an example with four camera modules. However, elevator control systems with three, five or more camera modules are also included within the spirit and scope of the present disclosure. For example, if the elevator control system 800 shown in FIGS. 8 and 9 includes the camera modules 804, 806 and 808 but excludes the camera module 810, then the image processor calculates the first positions of the object 902 with the camera module pair 804-806 and the second positions of the object 902 with the camera module pair 806-808, takes the intersection of the first and second positions as the position of the object 902, and maps the position of the object 902 to a button on the control panel 802, so as to command the control panel 802 to trigger the button.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A non-contact elevator control system, comprising:
    a control panel, including a rectangular region that includes a plurality of buttons;
    an image processor; and
    a first camera module and a second camera module, the first camera module and the second camera module being respectively arranged at a first corner and a second corner of the rectangular region of the control panel, the first corner and the second corner being adjacent to each other, wherein each of the first camera module and the second camera module includes a light-emitting source, the light-emitting source has at least a first luminance and a second luminance, and the first luminance is greater than the second luminance;
    wherein when an object enters a detection range, the image processor is configured to:
    record the object in the first luminance and the second luminance respectively by the first camera module to obtain a first high-luminance image corresponding to the first luminance and a first low-luminance image corresponding to the second luminance, and select one of the first high-luminance image and the first low-luminance image as a first image, wherein only the light-emitting source of the first camera module emits light in the first luminance and the second luminance to allow the first camera module to record the first high-luminance image and the first low-luminance image;
    record the object in the first luminance and the second luminance respectively by the second camera module to obtain a second high-luminance image corresponding to the first luminance and a second low-luminance image corresponding to the second luminance, and select one of the second high-luminance image and the second low-luminance image as a second image, wherein only the light-emitting source of the second camera module emits light in the first luminance and the second luminance to allow the second camera module to record the second high-luminance image and the second low-luminance image;

obtain a first imaging position of the object based on the first image recorded by the first camera module and a second imaging position of the object based on the second image recorded by the second camera module;

calculate a first position of the object in the control panel according to the first imaging position, the second imaging position and relative position information of the first imaging position and the second imaging position with respect to the first camera module and the second camera module; and send a command signal to the control panel according to a button corresponding to the first position; and the control panel triggers the button corresponding to the first position in response to the command signal.

2. The non-contact elevator control system as claimed in claim 1, wherein the field of view (FOV) of the first camera module and the FOV of the second camera module each encompasses an entirety of the control panel.

3. The non-contact elevator control system as claimed in claim 1, wherein:

the detection range is located in front of the control panel and is parallel to a virtual plane of the control panel;

each of the first camera module and the second camera module has an image sensor;

the virtual plane corresponds to a first pixel set within the image sensor of the first camera module and a second pixel set within the image sensor of the second camera module.

4. The non-contact elevator control system as claimed in claim 3, wherein the object enters the detection range when an object image of the object appears in the first pixel set and the second pixel set, and the object image stays over a trigger time.

5. The non-contact elevator control system as claimed in claim 4, wherein the operation of calculating the corresponding first position of the object in the control panel according to the first imaging position, the second imaging position and relative position information of the first imaging position and the second imaging position with respect to the first camera module and the second camera module is performed by the image processor to calculate the first position using a triangulation method.

6. The non-contact elevator control system as claimed in claim 1, further comprising a third camera module arranged at a third corner of the rectangular region of the control panel, the third corner being adjacent to the second corner.

7. The non-contact elevator control system as claimed in claim 6, wherein:

when the object enters the detection range, the image processor obtains a third imaging position of the object based on a third image recorded by the third camera module, calculates a second position of the object in the control panel according to the second imaging position, the third imaging position and relative position information of the second imaging position and the third imaging position with respect to the second camera module and the third camera module;

when the first position or the second position is not unique, the image processor takes the intersection of the first position and the second position as the position of the object;

the image processor sends a command signal to the control panel according to a button corresponding to the position of the object; and the control panel triggers the button corresponding to the position of the object in response to the command signal.

8. The non-contact elevator control system as claimed in claim 7, wherein the operation of calculating the second position of the object in the control panel according to the second imaging position, the third imaging position and relative position information of the second and third imaging positions with respect to the second camera module and the third camera module is performed by the image processor to calculate the second position using a triangulation method.

* * * * *